United States Patent Office 3,132,149
Patented May 5, 1964

3,132,149
SUBSTITUTED PYRROLIDINONES AND PIPERIDINONES
Newman M. Bortnick, Oreland, and Marian F. Fegley, Mont Clare, Pa., assignors to Rohm & Haas Company, Philadelphia, Pa., a corporation of Delaware
No Drawing. Filed Apr. 22, 1960, Ser. No. 23,893
6 Claims. (Cl. 260—294.7)

This invention deals with specific substituted pyrrolidinones and piperidinones as new compositions of matter. It further deals with a method for the preparation of these specific substituted pyrrolidinones and piperidinones.

The compounds of this invention are prepared by reacting a compound having the formula

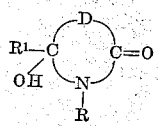

with an alcohol having the formula $R^2OH$. In the above formula, the symbol R represents a hydrogen atom, an alkyl group of one to eighteen carbon atoms, an aryl group of up to ten carbon atoms, an aralkyl group of up to twelve carbon atoms, an alkarylalkyl group of up to twenty carbon atoms, an alkoxyalkyl group of three to ten carbon atoms, and an alkylaminoalkyl group of three to eighteen carbon atoms provided that the amino group is a secondary or tertiary structure, that is, non-primary. Alkyl, in the above definition, is to be construed to include cycloalkyl and alkyl cycloalkyl within the range of carbon atoms previously set forth.

Typical R representations are hydrogen, methyl, ethyl, butyl, octyl, decyl, dodecyl, octadecyl, cyclopentyl, cyclohexyl, phenyl, naphthyl, benzyl, phenylethyl, methylphenyl, methoxyethyl, methoxypropyl, propoxyethyl, butoxyethyl, pentoxyethyl, N,N-dimethylaminoethyl, N,N-dipropylaminopropyl, morpholinopropyl and pyrrolidinoethyl.

The symbol $R^1$ represents hydrocarbon groups of one to ten carbon atoms, preferably alkyl, arylalkyl, cycloalkyl, aryl, and alkaryl. $R^1$ may typically represent methyl, butyl, octyl, benzyl, phenylbutyl, cyclopentyl, cyclohexyl, phenyl, naphthyl, butylphenyl groups, and the like.

D is a divalent chain containing two to three carbon atoms. The carbon atoms in the D chain may have their remaining valences satisfied by hydrogen atoms, by alkyl groups whose total carbon atom content is no greater than 18, or by combinations of hydrogen atoms and alkyl groups. When D contains two carbon atoms, there are four valences to be satisfied by hydrogen atoms, alkyl groups, or combinations thereof. For instance, there may be four hydrogen atoms, four alkyl groups, three hydrogen atoms and one alkyl group, two hydrogen atoms and two alkyl groups, or one hydrogen atom and three alkyl groups. When D contains three carbon atoms, there are six valences to be satisfied by hydrogen atoms, alkyl groups, or combinations thereof and these valences may be satisfied in a way analogous to the manner described above when D contains two carbon atoms. It is also possible for the above-mentioned alkyl substituents to be joined together to form carbocyclic rings in conjunction with the D chain. When D represents a three carbon chain $R^1$ may represent a hydrogen atom in addition to the other embodiment, discussed previously.

The alkyl substituents on the carbon atoms of the D chain may have any possible spatial configurations, such as normal, iso, tertiary, and the like. These alkyl substituents may also be straight chained or cyclic. Typical of the alkyl substituents that may be used to satisfy the remaining valences of the carbon atoms in the D chain, include methyl, ethyl, propyl, butyl, cyclopentyl, hexyl, cyclohexyl, octyl, decyl, dodecyl, tridecyl, tetradecyl, and octadecyl groups.

Typical of the specific substituted pyrrolidinones and piperidinones that may be employed as reactants in the present invention are 4,5-dimethyl-5-hydroxy-2-pyrrolidinone,
7a-hydroxy-3,3-pentamethylene-2,3,3a,4,5,6,7,7a-octahydroindol-2-one,
3-methyl-3,5-dipropyl-5-hydroxy-2-pyrrolidinone,
1-(2-phenylethyl)-3,3,5-trimethyl-5-hydroxy-2-pyrrolidinone,
3,3,5-trimethyl-5-hydroxy-2-pyrrolidinone,
3,5-dimethyl-3-neopentyl-5-hydroxy-2-pyrrolidinone,
1-(3-diethylaminopropyl)-3,3,5-trimethyl-5-hydroxy-2-pyrrolidinone,
1-(2-dimethylaminoethyl)-3,3,5-trimethyl-5-hydroxy-2-pyrrolidinone.
1-benzyl-3,3,5-trimethyl-5-hydroxy-2-pyrrolidinone,
1-p-tolyl-3,3,5-trimethyl-5-hydroxy-2-pyrrolidinone,
1-(3-dimethylaminopropyl)-3,5-dimethyl-3-neopentyl-5-hydroxy-2-pyrrolidinone,
1-(3-methoxypropyl)-3,3,5-trimethyl-5-hydroxy-2-pyrrolidinone,
3,5-dimethyl-3-hexyl-5-hydroxy-2-pyrrolidinone,
1-dodecyl-3,3,5-trimethyl-5-hydroxy-2-pyrrolidinone,
3,6-dimethyl-3-(2,2-dimethylpropyl)-6-hydroxy-2-piperidinone,
1-methyl-3,6-dipropyl-6-hydroxy-2-piperidinone,
1,3,3,6-tetramethyl-6-hydroxy-2-piperidinone,
1-(2-dimethylaminoethyl)-3,3,6-trimethyl-6-hydroxy-2-piperidinone,
3,3,6-trimethyl-6-hydroxy-2-piperidinone,
3,6-dimethyl-3-neopentyl-6-hydroxy-2-piperidinone,
3,6-dihexyl-3-methyl-6-hydroxy-2-piperidinone,
1-p-tolyl-3,3,6-trimethyl-6-hydroxy-2-piperidinone,
1,5,5-trimethyl-6-hydroxy-2-piperidinone,
5,5-dimethyl-4-ethyl-6-hydroxy-2-piperidinone,
3,6-di-(2-methylpropyl)-3-methyl-6-hydroxy-2-piperidinone,
1-(2-diethylaminoethyl)-5,5-dimethyl-6-hydroxy-2-piperidinone,
3,4-dimethyl-3-hexyl-6-hydroxy-2-piperidinone,
5,5-dimethyl-6-hydroxy-2-piperidinone,
spiro{3,3-dimethylbicyclo(2.2.1)heptane-2,3'-[6'-methyl-6'-hydroxy-2'-piperidinone]},
3,4,4-trimethyl-6-hydroxy-2-piperidinone,
3,5,5-trimethyl-6-hydroxy-2-piperidinone,
3,6-dibutyl-5-methyl-6-hydroxy-2-piperidinone.

The piperidinone and pyrrolidinone reactants employed in the present process may be obtained by cyclization of γ- and δ-oxonitriles. It is possible to start with γ- and δ-oxonitriles and, by cyclization and hydration, obtain the corresponding 5-hydroxy-2-pyrrolidinone and 6-hydroxy-2-piperidinone reactants. The products of this invention may then be derived by reaction with a compound having the formula $R^2OH$ in the presence of an alkali to be more fully described hereinafter. Thus, it is possible to go from the γ-oxonitriles and δ-oxonitriles to the specific 2-pyrrolidinones and 2-piperidinones of this invention in a rather continuous way without the necessity of separating or purifying the 5-hydroxy-2-pyrrolidinones or 6-hydroxy-2-piperidinones. It is, of course, generally desirable, from the viewpoint of yields, to employ as reactants the specific pyrrolidinones and piperidinones discussed heretofore.

The other reactant employed in the present invention has the formula $R^2OH$ in which $R^2$ contains from 1 to 18 carbon atoms. $R^2$ may be an alkyl group of 1 to 18 carbon atoms, a cycloalkyl group of 4 to 8 carbon atoms, alkoxyalkyl group of 2 to 18 carbon atoms, a phenylalkyl group of 7 to 18 carbon atoms, an alkyl substituted phenylalkyl group of 8 to 18 carbon atoms, a phenoxyalkyl group of 7 to 18 carbon atoms, an alkyl substituted phenoxyalkyl group of 8 to 18 carbon atoms, a phenoxypolyoxyalkyl group of 8 to 18 carbon atoms, an alkyl substituted phenoxypolyethoxyalkyl group of 9 to 18 carbon atoms, or a hydroxyalkyl group of 2 to 18 carbon atoms.

When $R^2$ represents a hydroxyalkyl group, the product will have the formula

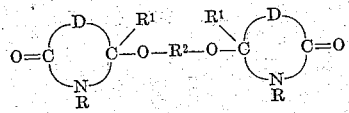

In all other instances, the product has the formula

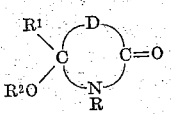

Typical of the $R^2OH$ reactants are methanol, ethanol, butanol, hexanol, decanol, dodecanol, hexadecanol, and octadecanol, methoxyethanol, methoxybutanol, methoxydecanol, methoxyhexadecanol, ethoxyethanol, ethoxyoctanol, ethoxydodecanol, propoxypropanol, propoxyheptanol, propoxyundecanol, butoxybutanol, butoxytetradecanol, hexoxyhexanol, hexoxydodecanol, octoxynonanol, octoxydecanol, monoxynonanol, decoxybutanol, dodecoxyhexanol, benzyl alcohol, phenylethanol, phenylbutanol, phenyldecanol, phenyldodecanol, methylphenylmethanol, butylphenyloctanol, dibutylphenylethanol, octylphenylethanol, nonylphenylpropanol, cyclohexanol, butylcyclohexanol, octylcyclohexanol, propylcycloheptanol, phenoxytriethoxyethanol, phenoxytripropoxypropanol, butylphenoxyethoxyethanol, octylphenoxyethoxyethanol, ethylene glycol, diethylene glycol, hexamethylene glycol, decamethylene glycol and octadecamethylene glycol. The two hydroxide groups may be positioned on any two carbon atoms in the alkylene chain with the alpha and omega positions somewhat preferred.

The present reaction is conducted in the presence of a basic catalyst ranging in amounts from .005% by weight to stoichiometric amounts, preferably employing amounts of about 0.1 to 20% by weight of the total weight of the reactants. Suitable as a catalyst are alkali metals and their carbonates, alkali and alkaline earth metal lower alkoxides, oxides and hydroxides, secondary amines, tertiary amines, and quaternary ammonium bases. Actually there may be employed as a catalyst any base whose aqueous 0.1 molar solution has pH of about at least 9. Typical examples of the catalyst that may be used are sodium, potassium, lithium, sodium methoxide, potassium butoxide, lithium ethoxide, magnesium ethoxide, sodium oxide, potassium hydroxide, calcium oxide, barium hydroxide, strontium hydroxide, sodium carbonate, potassium carbonate, dimethylamine, diethylamine, trimethylamine, triethylamine, triethanolamine, octyldimethylamine, N-methylmorpholine, benzyltrimethylammonium hydroxide, dibenzyldimethylammonium hydroxide, dodecenyltriethylammonium hydroxide, and the like.

Temperatures in the range of 35° to 150° C., preferably 50° to 110° C. are employed. The reaction is conducted within the temperature ranges at a temperature where the compound $R^2OH$ is liquid or molten. The reaction may be conducted without the use of a solvent, but a solvent is frequently desirable if the compound $R^2OH$ is neither liquid nor molten within the stated temperature ranges. If the solvent is desired, there may be used water, hydrocarbons, secondary or tertiary alcohols, ethers, nitriles, secondary amides and the like and preferably one that forms an azeotrope with water. Typically these may be benzene, toluene, heptane, isooctane, isopropyl alcohol, secondary butanol, tertiary butanol, methyl isobutylcarbinol, diisopropyl ether, dibutyl ether, acetonitrile, isobutyronitrile, dimethylformamide, dimethylacetamide, and the like.

The products obtained are pasty or crystalline solids or viscous liquids which are isolated generally by simply stripping off the lighter components. This is particularly so when only small amounts of catalyst are used. Otherwise, the catalyst is neutralized with acids, such as hydrochloric and sulfuric, and the products are separated from the salts by extraction with suitable solvents which dissolve the product but not the salts, such as benzene, and the like.

The products of this invention exhibit herbicidal activity. The present compounds are also effective miticides when employed in the normal concentrations according to standard procedures and are effective in controlling and killing armyworms according to usual techniques and using concentrations of two to three pounds per 100 gallons of spray mix. Particularly outstanding in this respect are the 5-methoxy-, the 5-(2-ethylhexoxy)-, and the 5-dodecoxy-3,3,5-trimethyl-2-pyrrolidinones.

The present invention can be more fully understood by the following examples which are offered by way of illustration and not by way of limitation. Parts by weight are used throughout.

*Example 1*

5-hydroxy-3,3,5-trimethyl-2-pyrrolidinone (90 parts) was added to methanol (120 parts) containing sodium hydroxide (0.5 part) at 50° C. When solution was complete, the mixture was cooled to 10° C. A white solid product crystallized (74 parts), M.P. 123.5 to 126° C. A second crop (7 parts) had a M.P. of 123° to 127° C. The melting point and mixed melting point of this compound with starting material showed that this simple act of recrystallization was sufficient to accomplish displacement of the hydroxyl by the methoxyl group. The product is identified as 5-methoxy-3,3,5-trimethyl-2-pyrrolidinone and has the formula

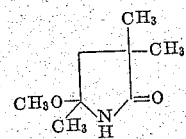

The product contains 8.91% nitrogen (theoretical 8.92%).

In a similar fashion, 5-methoxy-5-methyl-2-pyrrolidinone is prepared from methanol and 5-hydroxy-5-methyl-2-pyrrolidinone, 5-ethoxy-3,5-dimethyl-3-(2,2-dimethylpropyl)-2-pyrrolidinone is prepared from ethanol and 5-hydroxy-3,5-dimethyl-3-(2,2-dimethylpropyl)-2-pyrrolidinone, 7a-propoxy-3,3-pentamethylene-2,3,3a,4,5,6,7,7a-octahydroindol-2-one is prepared from 1-proponal and 7a-hydroxy-3,3-pentamethylene-2,3,3a,4,5,6,7,7a-octahydroindol-2-one, 5-butoxy-4,5-dimethyl-2-pyrrolidinone is prepared from butanol and 5-hydroxy-4,5-dimethyl-2-pyrrolidinone, and 5-methoxy-1,3,3,5-tetramethyl-2-pyrrolidinone is prepared from methanol and 5-hydroxy-1,3,3,5-tetramethyl-2-pyrrolidinone.

*Example 2*

It is also possible to obtain the above adduct from the crude hydroxylactam prepared from the ketonitrile and water in methanol solution. The desired product separates directly from the reaction mixture. Thus, 2,2-dimethyl-4-oxopentanonitrile (32 parts), methanol (50 parts), water (2 parts), and sodium hydroxide (0.5 part) were mixed and allowed to stand at room temperature for four days. Crystals began to separate after the first day. The mixture was stripped under reduced pressure and the residue was washed several times with acetone. The first crop had M.P. of 108° to 115° C. The product contains 8.75% nitrogen (theoretical 8.92%) and —OCH₃, 17.3% (theoretical 19.74%).

*Example 3*

5-hydroxy-3,3,5-trimethyl-2-pyrrolidinone (90 parts) and 2-ethylhexanol (400 parts) were heated at 70° C. for 24 hours in the presence of sodium methoxide (0.4 part). The reaction mixture was then stripped under reduced pressure to a pot temperature of 70° to 880° C. (1.0 mm.). This removed the water and excess 2-ethylhexanol. The residue is identified as the compound 5-(2-ethylhexoxy)-3,3,5-trimethyl-2-pyrrolidinone.

The product contains 6.10% nitrogen (theoretical 5.50%).

In a similar fashion are prepared 5-isooctoxy-3,3,5-trimethyl-2-pyrrolidinone from isooctyl alcohol and 5-hydroxy-3,3,5-trimethyl-2-pyrrolidinone, 5-benzyloxy-3,5-dimethyl-3-hexyl-2-pyrrolidinone from benzyl alcohol and 3,5-dimethyl-3-hexyl-5-hydroxy-2-pyrrolidinone, and 6-pentoxy-5,5-dimethyl-2-piperidinone from 6-hydroxy-5,5-dimethyl-2-piperidinone and pentanol. Likewise, 1-hydroxy-1-methyl-1,3,3a,4,5,6,7,7a - octahydroisoindol-3-one gives 1-(2-ethoxyethyl)-1-methyl-1,3,3a,4,5,6,7,7a-octahydroisoindol-3-one by reaction with ethoxyethanol, spiro {[3,3-dimethylbicyclo(2.2.1) - heptane]-2,3'-[5'-hydroxy-5'-methyl-2'-pyrrolidinone]} and ethanol give spiro {[3,3 - dimethylbicyclo(2.2.1)heptane]2,3'-[5'-ethoxy-5'-methyl-2'-pyrrolidinone]}, and 6-hydroxy-5-ethyl-5-butyl-2-piperidinone and methanol gives 6-methoxy-5-ethyl-5-butyl-2-piperidinone.

*Example 4*

5-hydroxy-3,5,5-trimethyl-2-pyrrolidinone (28.6 parts) and diethylene glycol (10.4 parts), benzene (100 parts by volume) and sodium methoxide (0.2 part) are boiled under reflux in an apparatus topped by a Dean-Stark water separator. When the theoretical amount of water (3.6 parts) is separated, the mixture is stripped under reduced pressure to a pot temperature of 70°/1 mm. The product which remains is the desired material, 1,7-bis-(3,3,5-trimethyl-2-pyrrolidinon-5-yl) - 1,4,7-trioxaheptane.

In a similar fashion, are prepared 5-octadecyloxy-3, 3,5-trimethyl-2-pyrrolidinone from octadecanol and 5-hydroxy-3, 3,5-trimethyl - 2 - pyrrolidinone, 1,6 - bis(4,5-dimethyl-2-pyrrolidinon-5-yloxy)-hexane from 1,6-hexanediol and 4,5-dimethyl-5-hydroxy-2-pyrrolidinone, 5-hexadecyloxy-3,5-dihexyl-3-methyl-2-pyrrolidinone is obtained from hexadecanol and 5-hydroxy-3,5-dihexyl-3-methyl-2-pyrrolidinone, and 6-octoxy-1,3,3,6-tetramethylpiperidinone is obtained from octanol and 6-hydroxy-1,3,3,6-tetramethylpiperidinone.

We claim:
1. A composition of matter from the class consisting of

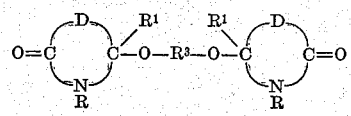

and

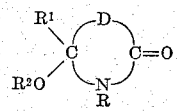

in which R is a member of the group consisting of hydrogen, alkyl of one to eighteen carbon atoms, phenyl, naphthyl, phenylalkyl of up to eighteen carbon atoms, alkylphenylalkyl of up to thirty carbon atoms, alkoxyalkyl of three to twenty-four carbon atoms, hydroxyalkyl of two to twelve carbon atoms, and alkylaminoalkyl of three to eighteen carbon atoms, $R^1$ is a hydrocarbon group of one to ten carbon atoms from the class consisting of alkyl, phenylalkyl, cycloalkyl, phenyl, naphthyl, and alkylphenyl, $R^2$ is a member from the class consisting of alkyl of one to eighteen carbon atoms, cycloalkyl of four to eight carbon atoms, alkoxyalkyl of two to eighteen carbon atoms, phenylalkyl of seven to eighteen carbon atoms, alkyl substituted phenylalkyl of eight to eighteen carbon atoms, phenoxyalkyl of seven to eighteen carbon atoms, alkyl substituted phenoxyalkyl of eight to eighteen carbon atoms, phenoxypolyalkoxyalkyl of eight to eighteen carbon atoms, and alkyl substituted phenoxypolyethoxyalkyl of nine to eighteen carbon atoms, $R^3$ is an alkylene of two to eighteen carbon atoms, and D is a divalent hydrocarbon chain containing two to three carbon atoms, the remaining valences of said two to three carbon atoms of said D are satisfied by members of the group consisting of hydrogen, alkyl having a total carbon atom content of up to eighteen and combinations of said hydrogen and said alkyl.

2. As a composition of matter, 5-methoxy-3,3,5-trimethyl-2-pyrrolidinone.

3. As a composition of matter, 5-(2-ethylhexoxy)-3,3,5-trimethyl-2-pyrrolidinone.

4. As a composition of matter, 6-pentoxy-5,5-dimethyl-2-piperidinone.

5. As a composition of matter, 1,7-bis-(2-pyrrolidinon-5-yl)-1,4,7-trioxaheptane.

6. As a composition of matter, 5-benzyloxy-3,5-dimethyl-3-hexyl-2-pyrrolidinone.

References Cited in the file of this patent

UNITED STATES PATENTS 2,654,764   Seeman et al. _____ Oct. 6, 1953
2,751,393   Schindler et al. _____ June 19, 1956

OTHER REFERENCES

Haller et al.: Chemical Abstracts, volume 8, page 2673[4] (1914), abstracted from Comptes rendus hebdomaires des sciences de l'academie des sciences, volume 158, pages 1086–1092.

Walton: Journal of the Chemical Society (1940), pages 438–441.

Noller: Chemistry of Organic Compounds, 2nd edition, pages 137–139 (1957); W. B. Saunders Co., Philadelphia.